C. F. CROMMETT.
CONTAINING APPARATUS AND VALVE SYSTEM THEREFOR.
APPLICATION FILED MAY 26, 1916.

1,353,320. Patented Sept. 21, 1920.

Inventor:
Charles F. Crommett,
by Emery, Booth, Janney & Varney
Attys.

UNITED STATES PATENT OFFICE.

CHARLES F. CROMMETT, OF CHELSEA, MASSACHUSETTS.

CONTAINING APPARATUS AND VALVE SYSTEM THEREFOR.

1,353,320.  Specification of Letters Patent.  Patented Sept. 21, 1920.

Application filed May 26, 1916. Serial No. 100,121.

*To all whom it may concern:*

Be it known that I, CHARLES F. CROMMETT, a citizen of the United States, and a resident of Chelsea, county of Suffolk, and State of Massachusetts, have invented an Improvement in Containing Apparatus and Valve Systems Therefor, of which the following description, in connection with the accompanying drawings, is a specification, like characters on the drawings representing like parts.

Figure 1:
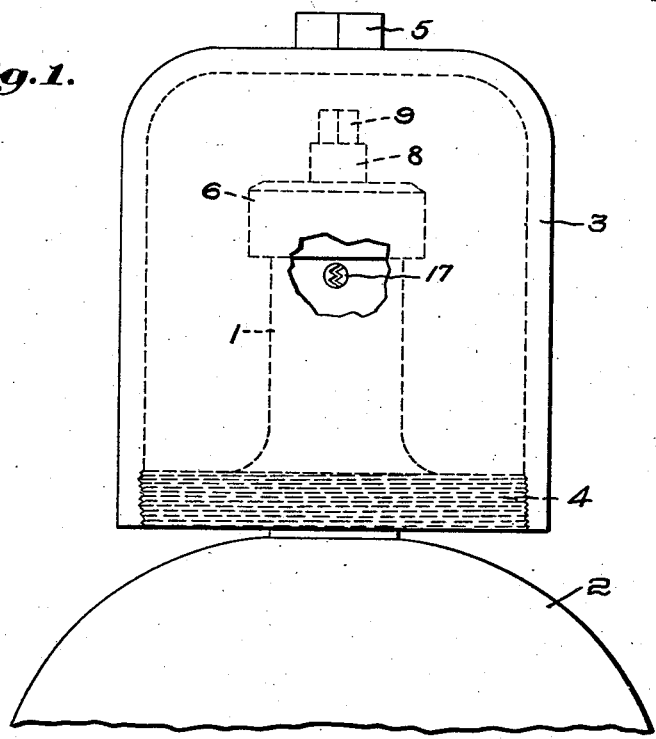
Figure 2:
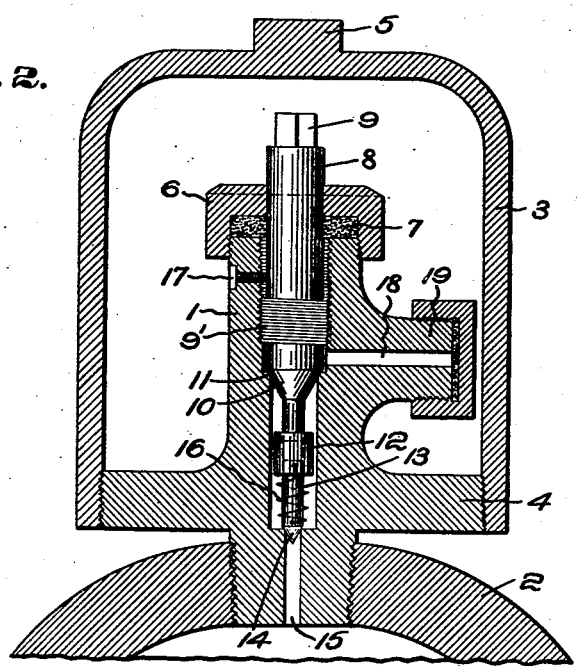

In the drawings, Figure 1 is an elevation showing the general relative position of the valve casing and protective cap; Fig. 2 is a sectional view showing the interior arrangement of the valve parts.

The specific illustrative embodiment of my invention here shown and described is a valve suitable for use as an outlet for gas or fluid held under pressure in metallic containers.

One of the objects of my invention is to provide a valve whereby the entrance of atmospheric air into the container may be prevented, and the exhausted container upon being returned to its filling station may be immediately refilled without the necessity of being first pumped out to empty it of air which without my invention would have passed into it following the exhaustion of the gas or fluid it originally contained.

I have shown the main valve body 1 screwed into the top of a gas or fluid container 2, and covered by a protecting cap 3 arranged to screw upon the flange 4 and provided at the top with the nut 5 to make it easily removable.

Upon the top of the valve body is screwed the usual nut 6 for retaining the packing 7. Through the center of the nut 6 fits the valve shank 8 which is provided at its upper end with a squared portion 9 to permit its being turned by a wrench. The upper part of the valve shank 8 is smooth, but near its lower end it is provided with threads 9' which fit corresponding threads in the bore of the valve body. Below the threads 9' the valve shank is tapered as at 10 to make a tight closure against the shoulder 11 in the valve bore.

Attached to a continuation of the valve shank is the cup 12 in which is slidably mounted the auxiliary plug 13, the end of which is tapered at 14 to fit snugly the upper orifice of the outlet bore 15. The upward movement of the plug 13 within the cup 12 is opposed by the coil spring 16 which may be secured to the plug in any usual and suitable manner.

Penetrating the side of the valve body a short distance above the threads 9' of the valve shank 8 is the screw 17 which is preferably provided with an irregularly shaped key-slot in its head to prevent its being turned by any implement other than a key made to fit it.

On the opposite side of the valve body is the nozzle 19, preferably threaded to receive a protecting cap. Through this nozzle the bore 18 connects with the interior valve chamber or bore and with the outlet bore 15.

The operation of my valve as applied, for example, to a container of gas under pressure is as follows:

The user of the gas permits it to flow out through the outlet bores 15 and 18 past the valve seat 11 in accordance with the manipulation of the valve through turning the valve shank 8. In using the ordinary valve, the user of the gas permits the tank to become practically empty and equal in its interior pressure to the pressure of the atmosphere outside, with the result that air leaks into the tank through the open valve. This results in the necessity for pumping out the empty containers before refilling them, a mixture of gas and air still remaining in the containers. This entails not only a waste of the gas, but also a considerable waste of time and power.

In my valve here shown, however, the plug 13 acts to prevent the escape of any gas from the container after the pressure within the tank has been reduced to say one pound to the square inch, the spring 16 being of sufficient strength to overcome any lower pressure. Thus when the pressure within the container is reduced to one pound the plug 13 closes the upper end of the outlet bore 15, preventing the further escape of gas, and also preventing any inlet of air from the outside.

The provision of the screw 17 makes it impossible for the user to unscrew the valve shank 8 to an extent sufficient to overcome the action of the spring 16 and so withdraw the plug 13.

Upon being refilled, the refilling apparatus is connected to the nozzle 19, the screw 17 is then retracted by turning it with a suitable key, and the valve shank 8 screwed upwardly a sufficient distance to withdraw the plug 13 from its seat in the upper aperture of the bore 15. The fresh gas then enters the container through the bore 18 and the container is thus refilled without the necessity of pumping out any air or other impurities.

While I have described one specific embodiment of my invention with particular reference to a valve for gas or fluid holding containers, my invention is obviously not limited to the specific construction shown nor to the specific use designated; and many modifications of my invention might be resorted to without departing from the scope or spirit thereof.

I claim:

1. In combination with a container for use in shipping gas under pressure, valve means providing a main closure, means for manually opening and closing said main closure, a supplemental closure normally opened by pressure of the gas when said main closure is open and gas is being discharged under pressure, and yielding means normally exerting closing pressure on said supplemental closure and automatically effective to close the supplemental closure when the pressure of the gaseous contents of the container has been reduced to a predetermined pressure, whereby air is excluded from entrance into said container.

2. In combination with a container for use in shipping gas under pressure, valve means providing a main closure, means for manually opening and closing said main closure, a supplemental closure normally opened by pressure of the gas when said main closure is open and gas is being discharged under pressure, and yielding means normally exerting closing pressure on said supplemental closure and automatically effective to close the supplemental closure when the pressure of the gaseous contents of the container has been reduced to a predetermined pressure, whereby air is excluded from entrance into said container, said main closure means and said supplemental closure means being operable at the same time to permit refilling of said container.

3. Portable containing apparatus for use in shipping or storing compressed gas comprising, in combination, a receptacle having a discharge passage and valve mechanism for controlling the egress of gas from said container through said discharge passage, said mechanism comprising main closure means, and auxiliary flow-governing means automatically operative to close said passage, independently of closure of said main closure means, when the pressure within the receptacle is reduced to a predetermined point.

4. Rechargeable containing apparatus for use in shipping or storing compressed gas comprising, in combination, a receptacle having a discharge passage and valve mechanism controlling the egress of gas from said container through said discharge passage, said mechanism comprising main closure means and auxiliary flow-governing means automatically operative to close said passage independently of closure of said main closure means, when the pressure is reduced to a predetermined point, and means for reopening said auxiliary flow-governing means when the receptacle is to be recharged.

5. A valve comprising a casing with a tubular bore, said bore having a valve seat near its middle portion and a smaller valve seat at or near its lower portion, a set-screw in the upper portion of said casing, a valve stem having a threaded portion, said set-screw projecting through said casing and overlapping the threaded portion of said valve stem to limit the withdrawal of said stem, said stem having a conical portion to engage the upper valve seat, and terminating in a cylindrical portion provided with a cylindrical bore extending partly through said cylindrical portion, a cylindrical pin slidably mounted in the bore of said cylindrical portion and terminating in a conical portion adapted to engage the lower valve seat, and spring means for moving said pin in said bore, said spring being attached to said cylindrical portion and to said pin.

6. Rechargeable containing apparatus for use in shipping or storing compressed gas comprising, in combination, a receptacle having a discharge passage and valve mechanism controlling the egress of gas from said container through said discharge passage, said mechanism comprising a yieldingly supported check valve normally automatically operative to close said discharge passage when the pressure in the container is reduced to a predetermined point, stop means normally opposing opening of said check valve, manually operable stop-withdrawing means and check valve opening means operable on withdrawal of said stop means whereby said check valve may be opened to permit recharging of said container through said discharge passage.

7. Rechargeable containing apparatus for use in shipping or storing compressed gas comprising, in combination, a receptacle having a discharge passage and valve mechanism controlling the egress of gas from said container through said discharge passage, said mechanism comprising a main valve and a yieldingly supported check valve normally automatically operative to close said discharge passage when the pressure in the container is reduced to a predetermined point, stop means normally opposing opening of said check valve, manually operable stop-withdrawing means and check valve opening means connected to said main valve and operable on withdrawal of said stop means whereby said check valve may be opened to permit recharging of said container through said discharge passage.

8. The method of charging gas into a container and discharging gas therefrom while preventing the admission of air into the container when substantially discharged, which comprises providing a yieldingly pressed closure in the discharge passage of the container, the pressure on said closure permitting the egress of gas above a predetermined pressure while opposing such egress below said pressure, thereby at all times to retain a minimum amount of gas in the container, and holding said closure open while forcing gas through said discharge passage in reverse direction to effect recharging of the container.

In testimony whereof, I have signed my name to this specification.

CHARLES F. CROMMETT.